United States Patent Office 3,733,253
Patented May 15, 1973

3,733,253
METHOD OF PRODUCING CITRIC ACID
Takashi Suzuki and Yasuhiro Sumino, Hyogo, Shunichi Akiyama, Kyoto, and Hideo Fukuda, Osaka, Japan, assignors to Takeda Chemical Industries, Ltd., Osaka, Japan
No Drawing. Filed July 15, 1970, Ser. No. 55,229
Claims priority, application Japan, July 15, 1969, 44/56,272
Int. Cl. C12d 1/04
U.S. Cl. 195—30
7 Claims

ABSTRACT OF THE DISCLOSURE

Citric acid is produced by a process which comprises contacting (+)-isocitric acid with a fermentation broth of a yeast capable of accumulating (+)-isocitric acid belonging to the genus Saccharomyces, Candida, Brettanomyces, Debaryomyces, Hansenula, Kloeckere, Trichosporon, Torulopsis or Pichia, the cells of said yeast, or a processed matter derived from the broth or the yeast cells, at pH 7.0 to 9.5, thereby convertnig (+)-isocitric acid to citric acid and subsequently recovering the citric acid so accumulated.

This invention relates to a method for producing citric acid.

It was reported by Abe et al. (French Pat. 1,571,551) that a certain yeast accumulates citric acid and/or (+)-isocitric acid. From the view point of citric acid production on a large commercial scale, however, the above process is not always satisfactory since the yield of citric acid on the basis of employed carbon sources is reduced in accordance with the increased amount of (+)-isocitric acid which is simultaneously produced.

In an attempt to overcome the drawback of the said process, the present inventors have carried out an intensive study and obtained the following findings:

(1) The fermentation broth of a yeast, the cells of a yeast as well as a processed matter derived from the broth or the yeast cells possess the activity of converting (+)-isocitric acid to citric acid,
(2) said yeast belongs to the genus Saccharomyces, Candida, Brettanomyces, Debaryomyces, Hansenula, Kloeckera, Trichosporon, Torulopsis or Pichia and is capable of producing (+)-isocitric acid,
(3) the converting activity is increased at —pH 7.0 to 9.5 and
(4) it is possible to specifically convert (+)-isocitric acid to citric acid in a high yield by employing the fermentation broth, the yeast cells, or a processed matter derived therefrom.

These findings are quite unpredictable since it is believed that there exist various types of enzymatic activities in the fermentation broth, yeast cells and processed mattters thereof which decompose or convert (+)-isocitric acid to substances other than citric acid.

The present invention has its basis on the above unpredictable findings and is of practical use on a large scale production.

Thus, the present invention relates to a method for producing citric acid which comprises contacting (+)-isocitric acid with a fermentation broth of a yeast capable of accumulating (+)-isocitric acid and belonging to the genus Saccharomyces, Candida, Brettanomyces, Debaryomyces, Hansenula, Kloeckera, Trichosporon, Torulopsis or Pichia, the cells of said yeast or a processed matter derived therefrom, at pH 7.0 to 9.5, thereby converting (+)-isocitric acid to citric acid and subsequently recovering the citric acid so accumulated.

The method of this invention can be carried out using by any yeast or mutant thereof which is capable of accumulating (+)-isocitric acid and belong to the genus Saccharomyces, Candida, Brettanomyces, Debaryomyces, Hansenula, Kloeckera, Torulopsis, Trichosporon or Pichia.

Among these microorganisms, yeasts of the genus Candida are the most suited for the purpose of this invention.

Typical yeasts which can be employed in the present invention are exemplified as follows.

In the list that follows, the ATCC numbers are the accession numbers at the American Type Culture Collection, Rockville, Md., U.S.A. and IFO numbers are the accession numbers at the Institute for Fermentation, Osaka, Japan.

Candida guilliermondii, IFO 0643
Candida guilliermondii var membranaefaceins, ATCC 20282
Candida parapsilosis, IFO 0708
Candida parasilosis var. tokyoensis, ATCC 20283
Candida tropicalis, IFO 0589
Candida mycoderma, IFO 0842
Candida intermedia, IFO 0761
Candida lipolytica, IFO 1437, ATCC 20114
Candida melibiosi, IFO 0961
Candida brumptii, IFO 0744
Candida sp. ATCC 202276 and other Candida species.
Debaryomyces kloeckeri, IFO 0019
Debaryomyces kloeckeri, ATCC 20278
Debaryomyces subglobosus, IFO 0794
Debaryomyces hansenii, IFO 0564 and other Debaryomyces species.
Hansenula silvicola, IFO 0807
Hansenula subpelliculosa, ATCC 20281
Hansenula suaveolens, IFO 0992
Hansenula miso, IFO 0146, and other Hansenula species.
Kloeckera apiculata, IFO 0865 and other Kloeckera species.
Torulopsis famata, IFO 0856
Torulopsis candida, ATCC 20284
Torulopsis ernobii, IFO 0654 and other Torulopsis species.
Pichia polymorpha, ATCC 20280
Pichia haplophila, IFO 0947
Pichia farinosa, IFO 0465 and other Pichia species.
Saccharomyces acidifaciens, IFO 0468
Saccharomyces willianus, IFO 0248 and other Saccharomyces species.
Trichosporon behrendii, ATCC 20279
Trichosporon capitatum, IFO 0743 and other Trichosporon species.
Brettanomyces claussenii, ATCC 20277
Brettanomyces lambicus, IFO 0797 and other Brettamomyces species.

The yeast is cultivated on a selected medium that suits the characteristics of the yeast. Assimilable carbon sources, such as carbohydrate as glucose, sucrose, etc., waste molasses, starch hydrolyzate, wood hydrolyzate, various alcohols such as ethanol, glycerol, etc., fatty acids such as acetic acid, oleic acid, etc., oils and fats such as soybean oil, fish oil, etc., hydrocarbons such as tetradecane, hexadecane, kerosene, gas oil, etc., crude preparations of the described hydrocarbons, and wide varieties of other organic compounds and compositions which the yeast may assimilate can be employed, singly or in combination. Of such carbon sources, paraffinic hydrocarbons are the most advantageous for commercial scale production.

As sources of nitrogen, inorganic ammonium salts such as ammonium chloride, ammonium sulfate, ammonium phosphate, etc., as well as organic ammonium salts such as ammonium acetate, and other organic nitrogen sources such as urea, yeast extract, corn steep liquor and the hydrolyzates of various proteinous materials may be used to advantage, either singly or as a mixture of two or more.

In addition to those carbon and nitrogen sources, it is desirable to incorporate various inorganic nutrients as well in the medium. Thus, where the yeast being employed require vitamins for growth, it is necessary to previously incorporate adequate amounts of such vitamins (e.g. biotin, pantothenate, inositol) or a material containing such vitamins, e.g. yeast extract in the medium.

The pH of the incubation is usually between about 3 and about 7, preferably between about 4 and about 6.5.

The pH of the medium is depressed with the progress of cultivation, and satisfactory results are in many cases obtained if a neutral salt such as calcium carbonate, calcium acetate or sodium acetate is previously incorporated in the medium as a neutralizer. Such a neutralizer may be repeatedly added during cultivation period. It should be understood that where a neutralizer is to be added in the course of cultivation, such other neutralizers as sodium hydroxide, calcium hydroxide, aqueous ammonia, etc. may also be employed as partial neutralizers.

The fermentation of the yeast is usually conducted under aerobic conditions. Where the medium constituents are insoluble or sparingly soluble in water, sufficient stirring and blending is essential, and conventional shaking culture method and stirring culture method under aeration substantially satisfy those conditions. In this connection, satisfactory results are at times obtained if a defoaming agent of a surfactant is previously added to the medium. The incubation temperature should vary with different species of yeast, but usually the range of 25° to 35° C. is preferable.

The fermentation broth thus obtained may be employed as such according to this invention. In case it is desired to separate the yeast cells, any of the conventional recovery means such as filtration, centrifugation, sedimentation, decantation, etc. may be employed.

Such fermentation broth or cells may be treated mechanically or chemically for the purpose of dehydration, purification or extraction of active fraction, stabilization of the activity, etc. so long as their original activity to convert (+)-isocitric acid to citric acid is not jeopardized.

Thus, in the present specification and claims, the term "processed matter" includes any of the liquid paste and powdery preparations which are obtainable by such means as contact or extraction with a solvent (e.g. chloroform, benzene, ethylacetate, alcohol, acetone), contact with a surfactant, chemical treatment (e.g. salting out), physiochemical treatment (e.g. various types of chromatography such as ion exchange cellulose, ion exchange resin, activated carbon, etc.), mechanical treatment (e.g. lyophilization, milling, concentration, drying, ultrasonic treatment) of the broth or yeast cells.

As regards (+)-isocitric acid which is to be converted to citric acid, the free acid, a salt thereof or a material containing either of them may be employed, irrespective of whether it is a purified preparation or a crude product. For instance, if (+)-isocitric acid has been accumulated in the broth prepared as above, the broth may be used as such. Alternatively, use may be made of a solution, a slurry or a dried mass of (+)-isocitric acid, a salt thereof, or a mixture thereof, which may be obtained from said broth by such conventional processes, either singly or in combination, a filtration, centrifugal separation, heating, precipitation, column chromatography, activated carbon treatment, concentration and dehydration.

In the present invention, the conversion of (+)-isocitric acid to citric acid is carried out in an aqueous medium.

The proportion of (+)-isocitric acid and the active materials, namely the fermentation broth, yeast cells or the processed matter should be selected so that the yield of citric acid may be maximal. Generally, about 10 parts to about 100 parts by weight of the active material calculated on a dry basis of yeast cells is satisfactory per 100 parts by weight of (+)-isocitric acid.

The conversion time needed is about 0.5 to 10 hours and the pH of the conversion system may range from neutrality to alkalinity, and more specifically from about pH 7.0 to about pH 9.5.

The temperature is generally between about 15 and about 50° C., and desirably between about 25° and about 45° C. The conversion system may be stirred, if necessary.

In order to maintain the pH of the system within a suitable range throughout the conversion period, use may be made of a buffer solution comprising a suitable combination of phosphates, tris(hydroxymethyl)aminomethane, glycine, borates, hydrochloric acid, sodium hydroxide, etc. Alternatively, the conversion may be conducted while the pH of the system is adjusted from time to time by the addition of an acid or alkaline reagent in the course of the reaction.

It is to be noted that the citric and (+)-isocitric acid in the system is to be assayed by Kuratomi's pentabromoacetone method (Seikagaku 27, 72 (1955)) and the enzymatic assay using (+)-isocitric acid dehydrogenase (Methods of Enzymatic Analysis, p. 318 (Verlag Chemie)), respectively.

The conversion is terminated when the output of citric acid has reached a predetermined level.

From this system, citric acid may be recovered directly or after the solid of the system has been previously removed by centrifugation or filtration, for instance.

The citric acid may thus be isolated and recovered by such techniques as filtration, centrifugation, heating, precipitation, column chromatography, activated carbon treatment, concentration, etc. To facilitate the separation process, the pH of the broth may be adjusted as desired. For instance, if the insoluble calcium salt is present in the system, it is expedient to acidulate the system so as to solubilize the same and then, separate the cells by, for example, centrifugation or filtration. The solution thus free of solids may be neutralized, if necessary, by the addition of sodium hydroxide, calcium carbonate or lime milk. From the preparation thus obtained, citric acid and, if present, the unreacted (+)-isocitric acid as well, are precipitated in the form of calcium salts, which are then recovered by, for example, filtration or centrifugation, followed by drying.

The procedure yields a white powder of calcium citrate or a white mixed powder of calcium citrate and calcium (+)-isocitrate.

This product may be made into pure citric acid by such means as neutralization, ion exchange treatment, column chromatography, decolorization, filtration, condensation, etc.

In the process, the recovered (+)-isocitric acid may be pooled so that it may be converted to citric acid. By repeating this cycle, all the (+)-isocitric acid may be ultimately converted to citric acid.

The following examples are merely illustrative of this invention and should by no means be construed as being limitative of the scope of thee invention.

In the following examples, parts by weight bear the same relation to parts by volume as do gram(s) to milliliter(s).

EXAMPLE 1

150 parts by volume of a tap-water solution of glucose 14%, $NH_4Cl$ 0.1%, $KH_2PO_4$ 0.05%, $MgSO_4 \cdot 7H_2O$ 0.05% and corn steep liquor 0.3% (pH 5.8) is incorporated into a fermenter of 200 parts by volume in capacity. After the fermenter is sterilized, 2.5 parts by weight of sterile calcium carbonate is added thereto. The fermenter is then inoculated with *Candida parapsilosis* var. *tokyoensis* ATCC 20283, and incubated at 28° C. for 5 days, at the end of which time the pH of the broth is 3.5. This fermentation gives 4.1 percent of (+)-isocitric acid based on the broth and, simultaneously, 1.3 percent of citric acid on the same basis. 100 parts by volume of the broth is adjusted to pH 2.0 with 3 N hydrochloric acid and, then, centrifuged. The cell fraction is suspended in 100 parts by volume of water and centrifuged. The cells are finally suspended in 50 parts by volume of tris (hydroxymethyl) aminomethane-hydrochloric acid buffer at pH 8.5.

The supernatant is pooled with the washing and brought to pH 7.0 by the addition of 5 N aqueous solution of sodium hydroxide. The system is held at 100° C. for 30 minutes, whereupon precipitates form. Those precipitates are recovered by suction-filtration when hot. In this manner, a mixture of calcium isocitrate and calcium citrate is obtained in an almost quantitative yield.

This mixture is suspended in about 10 volumes of water, and 50% sulfuric acid is added dropwise under stirring until the filtrate shows a faint sign of sulfate radical upon addition of barium chloride solution. It is then heated in boiling water for about 30 minutes, at the end of which time it is decolorized and filtered when hot. The filtrate is concentrated under reduced pressure and, while removing any precipitate of calcium sulfate, the concentration is continued until a syrup of low consistency is obtained. A hollow glass column, is filled with a mixture of 350 parts by weight of chromatographic grade silica gel in 250 parts by volume of 0.5 N $H_2SO_4$ and about 2500 parts by volume of chloroform containing 15% of n-butanol. On top of the column is passed a mixture of a solution of the above concentrate in about 20 parts by volume of 0.5 N $H_2SO_4$ and 30 parts by weight of the same chromatographic grade silica gel as above, together with a small amount of chloroform. The chloroform is allowed to run down under gravity.

After this passage, from the top of the silica gel layer two eluants prepared by shaking two different mixtures of n-butanol and chloroform, one containing 25% of n-butanol and the other containing 35% of n-butanol, with 0.5 N $H_2SO_4$ are run in that sequence and, if necessary, under pressure. By the second eluant containing 35% n-butanol, two acid fractions are eluted.

Of the two fractions, the second fraction is brought into an aqueous phase which is then concentrated under reduced pressure, whereupon 2.5 parts by weight of isocitric acid is obtained in the form of a syrup.

From the preceding acid fraction, about 0.7 part by weight of citric acid is recovered.

The above isocitric acid is dissolved in 25 parts by volume of tris (hydroxymethyl) aminomethane-hydrochloric acid buffer at pH 8.5 and the solution is combined with the cell suspension previously obtained. The mixture is adjusted to pH 8.5 with aqueous ammonia and allowed to stand at 32° C. for 6 hours. This reaction mixture contains 1.96 parts by weight of citric acid. The cells are removed by filtration and the filtrate is treated as above to recover 1.05 part by weight of citric acid.

This output plus the previous yield of 0.7 part by weight gives a total yield of 1.75 parts by weight of citric acid.

EXAMPLE 2

*Candida lipolytica* (ATCC 20114) is used to inoculate 200 parts by volume of fermenter containing 150 parts by volume of a medium composed of n-paraffin mixture of $C_{12}$–$C_{18}$, 8% (92% purity), $NH_4Cl$ 0.3% $KH_2PO_4$ 0.05%, $MgSO_4 \cdot 7H_2$ 0.05%, $FeSO_4 \cdot 7H_2O$ 0.05% and $CaCO_3$ 0.5% (pH 6.5), which have been sterilized with 0.00004 part by weight of bromocresol green. The fermenter is incubated for 3 days, the medium being adjusted to yellowish green (i.e. pH 4–5) with $NH_4OH$ in the course of cultivation. At the end of the above incubation time, the broth contains 49 mg. of citric acid/ml. and 52 mg. of isocitric acid/ml. The pH of the broth is 4.5. 100 parts by volume of the broth is suction-filtered through a filter paper to remove the cells and the filtrate is adjusted to pH 7.0 by the addition of $Ca(OH)_2$. It is then heated to boil under a slightly reduced pressure. After 30 minutes, the system is cooled and the resulting precipitates are recovered by filtration and dried in a current of air. The procedure yields calcium citrate which contains 4.7 parts by weight of citric acid. The salt is suspended in 40 parts by volume of water and the suspension is neutralized with 5 N —$H_2SO_4$. Activated carbon (1 part by weight) is added to the supernatant, followed by filtration. The filtrate is then concentrated under reduced pressure until a syrup of low consistency is obtained (any precipitate of calcium sulfate is filtered off from time to time). The concentrate is allowed to stand in a refrigerator, whereupon 4.05 parts by weight of crystalline citric acid (as citric anhydrate) is obtained.

The filtrate from which calcium citrate has been removed contains 4.8 parts by weight of isocitric acid. To this filtrate is added the entire amount of the cells separated from the above broth (100 parts by volume), followed by adjustment to pH 8.5 with aqueous ammonia. One percent of chloroform (volume/volume) is added, and the mixture is allowed to stand at 32° C. for 4 hours, at the end of which time the cells are removed by filtration. The filtrate is treated in a manner similar to that used above for the recovery of citric acid.

The procedure yields 3.9 parts by weight of crystalline citric acid (as anhydrate).

EXAMPLE 3

100 parts by volume of the fermentation broth obtained in Example 2 is adjusted to pH 8.5 with 5 N NaOH, followed by the addition of 1% (by volume) benzene.

The system is allowed to stand on an incubator for 4 hours, at the end of which time it contains 83 mg. of citric acid/ml. and 17 mg. of isocitric acid/ml. the values representing considerable improvements.

The entire amount of the broth is treated in a manner similar to that described in Example 2 to recover citric acid. The procedure gives a yield equivalent to 6.9 parts by weight of anhydrous crystals.

EXAMPLE 4

100 parts by volume of a tap-water solution containing $NH_4Cl$ 0.3%, $KH_2PO_4$ 0.1%, $MgSO_4 \cdot 7H_2O$ 0.1% and yeast extract 0.1% is incorporated into a fermenter of 300 parts by volume in capacity. After sterilization, 100 parts by volume of 25.0% sterile solution of calcium acetate (monohydrate) are added to each flask. All those flasks are inoculated with Candida species (ATCC 20276) and the inoculated fermenter is incubated for 7 days, at the end of which time the pH of the fermentation broth is 5.5. This fermentation yields 2.8% of isocitric acid relative to the broth. In this example, no citric acid is observed. 100 parts by volume of the broth is subjected to an ultrasonic treatment at 19 kilocycles for 30 minutes, at the end of which time it is adjusted to pH 8.5. The broth is allowed to stand at 32° C. for 4 hours and the yield of citric acid is measured. The yield of the acid is as high as 2.4%. The procedure described in Example 2 is followed to recover the citric acid from the broth, whereupon 82.5% of citric acid in the broth sample is obtained as crystals.

EXAMPLE 5

A tap-water solution containing $NH_4NO_3$ 0.1%, $KH_2PO_4$ 0.05%, $MgSO_4 \cdot 7H_2O$ 0.05% and corn steep liquor 0.3% is adjusted to pH 5.8, and 150 parts by volume of the solution is incorporated into a fermenter of 300 parts by volume in capacity, followed by the addition of 9 parts by weight of glycerin or 9 parts by volume of ethanol. After sterilization, 4.5 parts by weight of sterile calcium carbonate is added to the fermenter. The fermenter is inoculated with *Hansenula subpelliculosa* (ATCC 20281), and the inoculated fermenter is incubated for 5 days, at the end of which time the pH of the broth is 3.5.

This fermentation process yields 1.5%, where the carbon source used is glycerin, and 1.4%, where ethanol is used as the carbon source, of isocitric acid. Citric acid is also produced simultaneously, but its amount is 0.9% of the broth where the carbon source is glycerin, or 0.5% where the carbon source is ethanol. These broth is treated in a manner similar to that described in Example 2, whereupon citric acid is invariably obtained in a purified yield of 83% to 85%. The supernatants obtained after the precipitation of calcium citrate in the above process are pooled for each broth sample, and 3 parts (on a wet basis) of the cells of *Pichia polymorpha* (ATCC 20280) which has been cultivated at 28° C. for 3 days on a medium (pH 6.0) which is a tap-water solution of glucose 6%, calcium acetate 6% (monohydrate), $NH_4Cl$ 0.05%, $KH_2PO_4$ 0.05%, $MgSO_4 \cdot 7H_2O$ 0.05% and corn steep liquor 0.2% is added to 100 parts by volume of the combined supernatant fluid, which is then adjusted to pH 8.5 with aqueous ammonia.

Such mixtures are allowed to stand at 34° C. for 5 hours, at the end of which time the outputs of citric acid are 1.2% and 0.69%, respectively.

Those reaction mixtures are treated in a manner similar to that described in Example 2.

On the basis of those mixtures, the yields of citric acid are 86% and 83%, respectively.

EXAMPLE 6

A tap-water solution containing glucose 12%, $NH_4Cl$ 0.1%, $KH_2PO_4$ 0.05%, $MgSO_4 \cdot 7H_2O$ 0.05% and corn steep liquor 0.2% is adjusted to pH 5.8 and 150 parts by volume each of the solution is incorporated into each fermenter of 300 parts by volume in capacity, which is sterilized. Then, 6 parts by weight of sterile calcium carbonate is added to each fermenter, which is inoculated with *Debaryomyces kloeckeri* ATCC 20278, *Trichosporon behrendii* ATCC 20279 or *Brettanomyces claussenii* ATCC 20277, respectively. Each inoculated fermenter is incubated for 5 days.

The outputs of (+)-isocitric acid are 0.6% for *Debaryomyces kloeckeri*, 1.0% for *Trichosporon behrendii* and 1.0% for *Brettanomyces claussenii*. Simultaneously, citric acid is also produced in yields of 0.5% for the Debaryomyces species, 0.6% for the Trichosporon species and 1% for *Brettanomyces claussenii*. Those fermentation broths are treated by the procedure described in Example 2, whereupon citric acid is obtained in almost quantitative yields for each of the organisms. As the isocitric acid fractions obtained above (i.e. the supernatants after the precipitation of calcium citrate and the mother liquors after the crystallization of citric acid) are combined for each organism, it is found that 87% of the isocitric acid produced in each broth is contained therein.

To each of the above products are added the entire amount of the wet cells obtained by centrifuging each broth at 5000 r.p.m. for 20 minutes, so that they are allowed to react in the same manner as Example 2. It is found that, for both organisms, the isocitric acid is converted to citric acid at a conversion rate of about 83 percent. Each of the reaction products is subjected to a citric acid recovery process similar to that described above, whereupon citric acid is obtained in a yield of 85%.

EXAMPLE 7

A tap-water solution containing waste cane sugar molasses 20% (reducing sugar 12.5% as glucose), $NH_4Cl$ 0.10%, $KH_2PO_4$ 0.05% and $MgSO_4$ 0.05% is adjusted to pH 5.5, and 200 parts by volume of the solution is incorporated into a fermenter of 300 parts. By volume in capacity, which is sterilized.

Then, 6.0 parts by weight of sterile calcium carbonate is added to the fermenter. *Candida guilliermondii* var. *membranaefaciens* ATCC 20282 is used to inoculate the fermenter, which is shaken mechanically in the same manner as described above. After the cultivation is complete, the pH of the broth is 5.5.

This fermentation yields 3.75% of citric acid (calculated as citric anhydrate) relative to the broth, and from this broth, 9.4 parts by weight (dry weight) of calcium citrate per 200 parts by volume of the broth is obtained by the procedure described in Example 2. This amount corresponds to 7.2 parts by weight of citric anhydrate.

On the other hand, the wet cells obtained are lyophilized and stored. In 100 parts by volume of disodium phosphate-monopotassium phosphate buffer at pH 8.5 is dissolved 5 parts by weight of monopotassium isocitrate, and 5 parts by weight of the stored dry cells are added. The mixture is stirred well and accurately adjusted to pH 8.5 with a sodium hydroxide solution. The system is allowed to stand at 32° C. for 5 hours, at th end of which time the organisms are filtered off. The supernatant is treated in the same manner as Example 2, whereupon 3.55 parts by weight of citric acid is obtained.

EXAMPLE 8

*Torulopsis candida* ATCC 20284 is used to inoculate 200 parts by volume of fermenter containing 150 parts by volume of a medium composed of n-paraffin mixture of $C_{12}$–$C_{18}$ 8% (92% purity), $NH_4Cl$ 0.3%, $KH_2PO_4$ 0.05% $MgSO \cdot 7H_2O$ 0.05%, $FeSO_4 \cdot 7H_2O$ 0.05% and $CaCO_3$ 0.5% (pH 6.5) and incubated for 3 days in the same manner as in Example 2. At the end of the incubation time, the broth contains 21 mg. of citric acid/ml. and 28 mg. of (+)-isocitric acid/ml. 100 parts by volume of the broth is adjusted to pH 8.5 with 5 N NaOH and 1 part by volume of xylene is added thereto. The whole system is allowed to stand at 35° C. under stirring, which results in 41 mg. of citric acid/ml. and 8 mg./ml. of (+)-isocitric acid/ml.

The reaction mixture is treated in the same manner as in Example 1 to give 3.4 parts by weight of citric acid (as anhydrate).

We claim:
1. A method for producing citric acid from (+)-isocitric acid which comprises contacting (+)-isocitric acid with cells of a yeast capable of accumulating (+)-isocritic acid belonging to the genus Saccharomyces, Candida, Brettanomyces, Debaryomyces, Hansenula, Kloeckera, Trichosporon, Torulopsis or Pichia, at a pH of about 8.5 in a period of 0.5 to 10 hours, converting the (+)-isocitric acid to citric acid and recovering the citric acid thus produced.

2. A method according to claim 1, wherein the yeast source is a fermentation broth which contains about 10 to 100 parts by weight of yeast cells on a dry basis, about 10 to 100 parts by weight of yeast cells from said amount of the broth is contacted with 100 parts by weight of (+)-isocitric acid.

3. A method according to claim 4, wherein the temperature at which the (+)-isocitric acid is contacted is between about 25 and about 45° C.

4. A method according to claim 1 wherein the yeast is employed as a fermentation broth containing an organic solvent or surfactant.

5. A method according to claim 1 wherein the cells have been subjected to mechanical or physio-chemical treatment yet retain their ability to convert (+)-isocitric to citric acid.

6. A method according to claim 5 wherein the cells are employed as a fermentation broth.

7. A method according to claim 1 wherein the yeast cells free of fermentation broth are employed.

References Cited

FOREIGN PATENTS 1,571,551  6/1969  France.

OTHER REFERENCES

Abe et al.: "Agr. Biol. Chem.," pp. 392–3, 1968.

A. LOUIS MONACELL, Primary Examiner

G. M. NATH, Assistant Examiner

U.S. Cl. X.R.

195—37